(12) United States Patent
Ohno et al.

(10) Patent No.: US 7,885,523 B2
(45) Date of Patent: Feb. 8, 2011

(54) IMAGE PICKUP APPARATUS

(75) Inventors: Takehide Ohno, Yokohama (JP); Toshiyuki Kobayashi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 174 days.

(21) Appl. No.: 12/372,298

(22) Filed: Feb. 17, 2009

(65) Prior Publication Data

US 2009/0208196 A1  Aug. 20, 2009

(30) Foreign Application Priority Data

Feb. 18, 2008  (JP) ............... 2008-035550

(51) Int. Cl.
*G03B 17/00* (2006.01)
*H04N 5/228* (2006.01)

(52) U.S. Cl. .................... 396/55; 348/208.99

(58) Field of Classification Search .............. 396/52, 396/53, 55; 348/208.99, 208.1, 208.2, 208.4, 348/208.5, 208.7, 208.11
See application file for complete search history.

(56) References Cited

U.S. PATENT DOCUMENTS 7,424,212 B2 * 9/2008 Ebato ...................... 396/53

2007/0154195 A1  7/2007  Irisawa et al.

FOREIGN PATENT DOCUMENTS

| JP | 2000-66258 | 3/2000 |
|---|---|---|
| JP | 2004-274242 | 9/2004 |
| JP | 2007-129700 | 5/2007 |
| WO | WO 2008/023815 | 2/2008 |

* cited by examiner

*Primary Examiner*—W. B. Perkey
*Assistant Examiner*—Minh Q Phan
(74) *Attorney, Agent, or Firm*—Dickstein Shapiro LLP

(57) ABSTRACT

An image pickup apparatus includes a gyro sensor 1240 that detects camera shakes, a feed forward value is calculated by multiplying a first coefficient c1 to an output value of the gyro sensor 1240 when the output value of the gyro sensor 1240 is less than a first predetermined value, another feed forward value is calculated by multiplying a second coefficient c2 smaller than the first coefficient c1 to an output value of the gyro sensor 1240 when the output value of the gyro sensor 1240 is greater than or equal to the first predetermined value, each of the products is respectively added by an addition device to an output value of a drive signal.

3 Claims, 14 Drawing Sheets

IMAGE PICKUP APPARATUS

PRIORITY CLAIM

This application claims priority from Japanese Patent Application No. 2008-035550, filed with the Japanese Patent Office on Feb. 18, 2008, the contents of which are incorporated herein by reference in their entirety.

BACKGROUND OF THE INVENTION

1. Field of the Invention

The present invention relates to an image pickup apparatus, for example, a digital camera or the like having a blurring compensation function.

2. Description of the Related Art

Conventionally, a digital image pickup apparatus is known as an image pickup apparatus having a blurring compensation mechanism. In an image pickup apparatus described in JP2004-274242A, a fixed cylinder is fitted on a main body case. The fixed cylinder stores a lens barrel on a photographing optical axis. A guide stage is disposed in a side of one end of the fixed cylinder. The photographing optical axis is set as a Z axis direction. A movable frame is held movably along an X-Y plane orthogonal to the photographing optical axis. An image pickup device, for example, a CCD is fixed in the movable frame. The guide stage is fixed on the photographing optical axis within the main body case. The movable frame is guided by the guide stage and driven along the X-Y plane by way of the magnetic force generated by permanent magnets or electromagnetic coils facing the permanent magnets. In the conventional image pickup apparatus, a calculation processing device disposed in the main body case performs a control that moves the CCD fixed in the movable frame following the movement of a photogenic subject image due to blurring by shifting the current applied to the electromagnetic coils in correspondence to tilts of the main body case in the X direction and the Y direction.

JP2004-274242A discloses the mechanism to perform the aforementioned blurring compensation.

In addition, an optical device described in JP2000-66258A includes a shake detection device that detects information of shakes generated in the optical device, a signal processing device that processes output signals of the blurring detection device, a blurring compensation lens driven to compensate blurring of an image generated due to shakes of the optical device and a control device that drives the blurring compensation lens to compensate blurring of the image. Then in order to reduce the influences of the frictional force present when the blurring compensation lens is driven, the control device adds or subtracts a predetermined value to the output value of drive signal corresponding to driven directions of the blurring compensation lens and performs drive control of the blurring compensation lens based on the added value or the subtracted value so that effects of blurring compensation are improved. However, generally, between a static frictional force and kinetic frictional force, the static frictional force is comparatively large. Therefore, when simply a constant predetermined value is added or subtracted to the output value of drive signal of the blurring compensation lens, it is problematic that the drive force becomes insufficient when the blurring compensation lens is driven from a stopped state or the drive force becomes excessive after the blurring compensation lens is driven.

SUMMARY OF THE INVENTION

The present invention is made to solve the above described problems. An object of the present invention is to provide an image pickup apparatus that appropriately reduces influences of frictional forces present in a blurring compensation mechanism so that errors generated due to controls of the blurring compensation mechanism can possibly be suppressed.

To accomplish the above object, an image pickup apparatus according to one embodiment of the present invention is configured to add a compensation value to an output value of drive signal of a blurring compensation device for compensating the influences of the static frictional force because influences of the static frictional force are large when the blurring compensation mechanism is shifted from a non-driven state to a driven state. Besides, when the blurring compensation mechanism is in a driven state in which the static frictional force is shifting to kinetic frictional force, the present invention adds a smaller compensation value to an output value of drive signal of the blurring compensation device for compensating the influences of the kinetic frictional force. By the above processes, the present invention is purported to appropriately reduce influences of the static frictional force and the kinetic frictional force so that errors generated due to control of the blurring compensation mechanism can possibly be suppressed. In addition, the present invention adds a compensation value to an output value of drive signal of the blurring compensation device for compensating the influences of the static frictional force and the kinetic frictional force when the blurring compensation mechanism is shifted from a stopped state to a driven state (accelerate). In addition, the present invention does not add a compensation value to an output value of drive signal of the blurring compensation device when the blurring compensation mechanism is shifted from a driven state to a stopped state (decelerate). By the above processes, the present invention is purported to prevent an output value of the drive signal of the blurring compensation device to be excessively large and the influences of the static frictional force and the kinetic frictional force are reduced to a further appropriate level so that errors generated due to control of the blurring compensation mechanism are made small.

BRIEF DESCRIPTION OF THE DRAWINGS

FIG. 9A is a back view of the fixed cylinder illustrated in FIG. 7, in particular, a diagram illustrating a state in which a flexible print substrate is not fitted on. FIG. 9B is a back view of the fixed cylinder illustrated in FIG. 7, in particular, a diagram illustrating a state in which the flexible print substrate is fitted on.

DETAILED DESCRIPTION OF THE PREFERRED EMBODIMENTS

An image pickup apparatus including a blurring compensation mechanism (blurring compensation device) according to an embodiment of the present invention, for example, a digital camera is described hereinbelow.

(A General Constitution of a Digital Camera)

Figure 1:
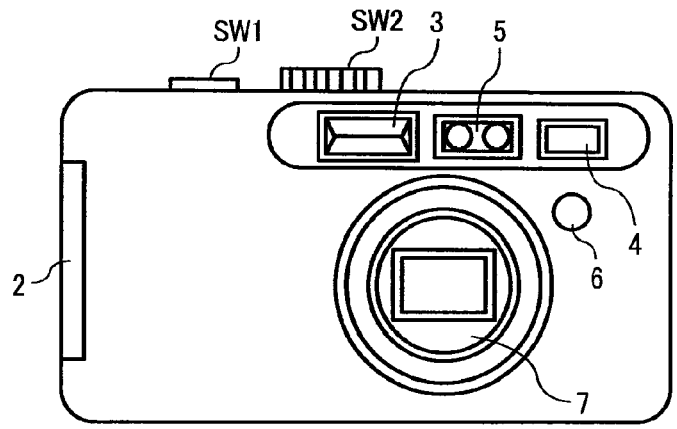
FIG. 1 is a front view of a digital camera according to the present invention.
Figure 2:
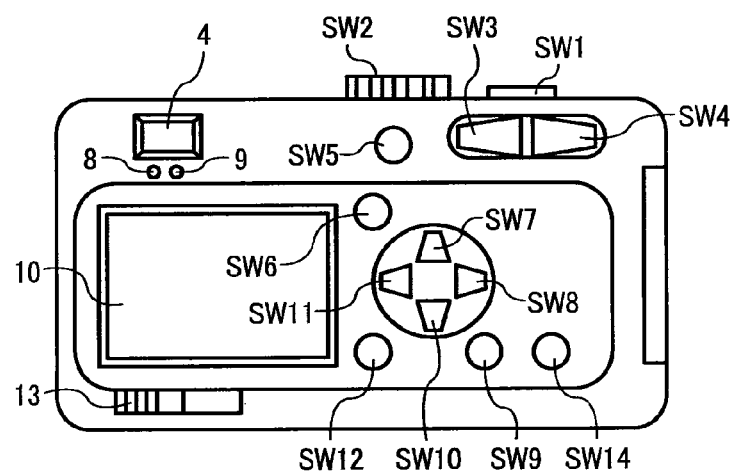
FIG. 2 is a back view of the digital camera according to the present invention.
Figure 3:
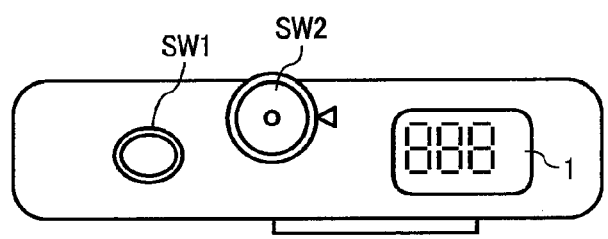
FIG. 3 is a top view of the digital camera according to the present invention.
Figure 4:
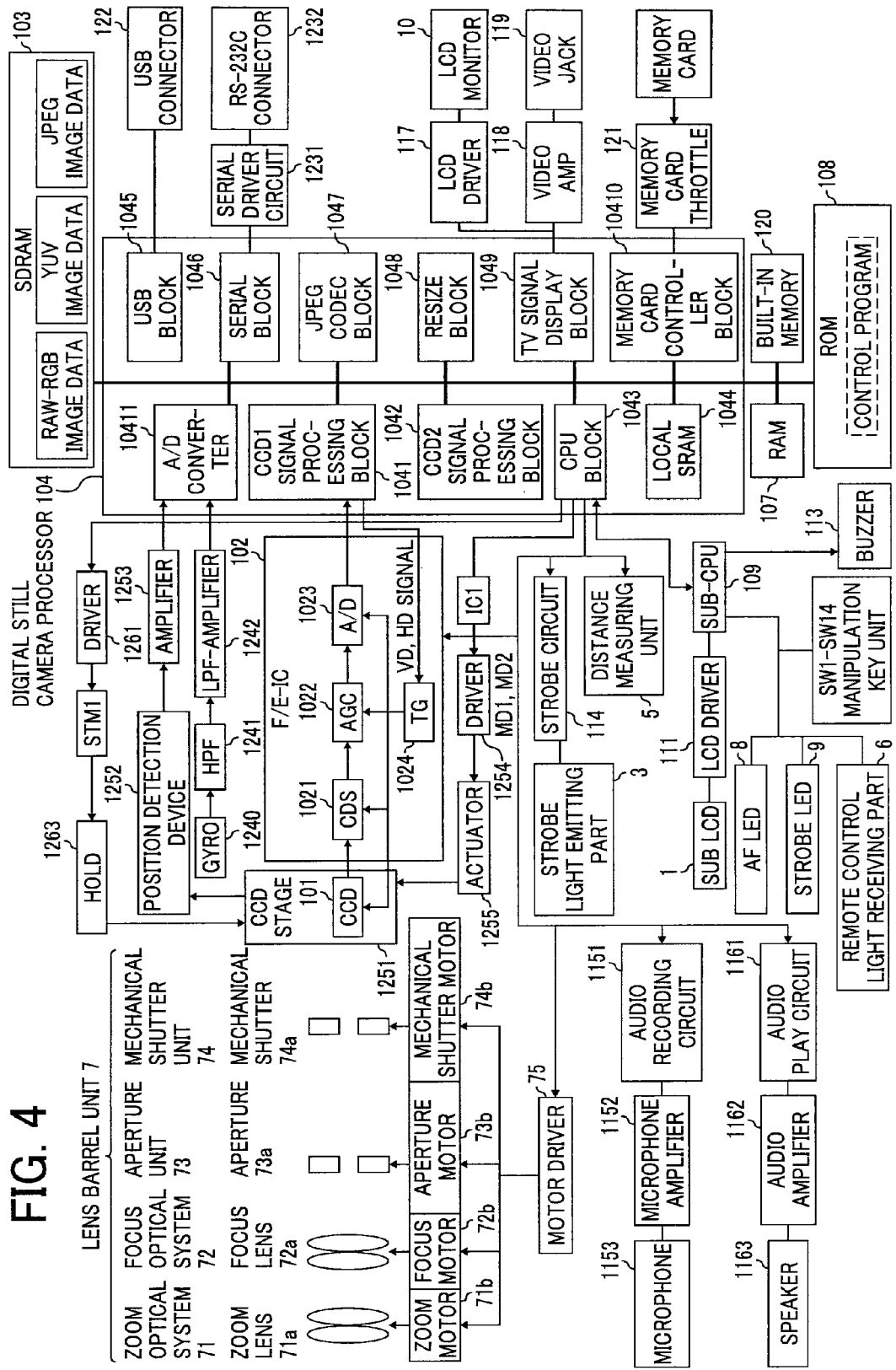
FIG. 4 is a block diagram that illustrates the approximate system constitutions internal to the digital camera according to the present invention.

FIG. 1 is a front view that illustrates an example of an image pickup apparatus according to the present invention, for example, a digital still camera (termed camera hereinbelow). FIG. 2 is a back view of the digital camera. FIG. 3 is a top view of the digital camera. FIG. 4 is a block diagram that illustrates an approximate system constitution in the digital camera.

As illustrated in FIG. 3, a release switch (release shutter) SW1, a mode dial SW2 and a sub liquid crystal display (also termed sub-LCD) 1 are disposed on an upper surface (the upper surface when the side of the photogenic subject is set as a front surface) of a camera main body.

As illustrated in FIG. 1, a lens barrel unit 7 including a photographing lens, an optical finder 4, a strobe light emitting part 3, a distance measuring unit 5 and a remote control light receiving part 6 are disposed on the front surface (the side of the photogenic subject) of the camera main body.

As illustrated in FIG. 2, a power source switch SW13, an LCD monitor 10, an LED 8 for use in auto focus lock confirmation, an LED 9 for use in strobe light emission preparation confirmation, an optical finder 4, a zoom switch SW3 of a wide angle side, a zoom switch SW4 of a telephoto side, a self-timer setting and deletion switch SW7, a menu display switch SW6, a strobe setting or upward moving switch SW7, a rightward moving switch SW8, a display switch SW9, a macro or downward moving switch SW10, an image confirmation or leftward moving switch SW11, an OK switch SW12 and a blurring compensation switch SW14 are disposed on a rear surface (the side of the photographer) of the camera main body. A lid 2 covering a memory card room or a battery load room is disposed on a side surface of the camera main body.

Next, system constitutions in the camera are described.

In FIG. 4, reference number 104 is a digital still camera processor (termed processor hereinbelow).

The processor 104 includes an A/D converter 10411, a CCD1 signal process block 1041, a CCD2 signal process block 1042, a CPU block 1043, a local SRAM 1044, a USB interface block 1045, a serial (interface) communication block 1046, a JPEG CODEC block 1047 that performs JPEG compression and decompression, a resize block 1048 that enlarges and reduces the sizes of image data by an interpolation processing, a TV signal display block 1049 that converts image data to video signals for displaying on a display device of a liquid crystal monitor and TV or the like and a memory card controller block 10410 that performs control of a memory card recording photographed image data. Each of these blocks is mutually connected by a bus line.

An SDRAM 103 storing RAW-RGB image data (image data of a state in which white balance setting and γ setting are performed), YUV image data (image data of a state in which brightness data and color difference data conversion are performed) and JPEG image data (image data of a JPEG compressed state) is disposed in an external part of the processor 104. The SDRAM 103 is connected to the processor 104 via a memory controller (abbreviated for illustration) and a bus line.

A RAM 107, a built-in memory 120 for storing photographed image data even in the case a memory card is not loaded in a memory card throttle, a control program and a ROM 108 in which parameters or the like are stored are further disposed in the external part of the processor 104. These components are also connected to the processor 104 via a bus line.

When the power source switch SW13 of the camera is turned on, the control program stored in the ROM 108 is loaded to a main memory (abbreviated for illustration) of the processor 104. The processor 104 performs operational control of each part according to the control program and stores temporarily control data and parameters or the like in the RAM 107 or the like.

The lens barrel unit 7 includes a lens barrel. The lens barrel includes a zoom optical system 71, that is, a lens system having a zoom lens 71a, a focus optical system 72, that is, a lens system having a focus lens 72a, an aperture unit 73 having an aperture stop 73a and a mechanical shutter unit 74 having a mechanical shutter 74a.

The optical system 71 for zooming, the optical system 72 for focusing, the aperture unit 73 and the mechanical shutter unit 74 are each respectively driven by a motor 71b for zooming, a motor 72b for focusing, an aperture motor 73b and a motor 74b for the mechanical shutter.

Each of these motors is driven by a motor driver 75 and the motor driver 75 is controlled by a CPU block 1043 of the processor 104.

Each lens system of the lens barrel unit 7 images a photogenic subject image on a CCD) 101. The CCD 101 converts the photogenic subject image to image signals and outputs the image signals to an F/E-IC 102. F/E-IC 102 includes a CDS 1021 that performs a correlated double sampling processing for removing image noise, an AGC 1022 for automatic gain control, an A/D converter 1023 that performs A/D (analog/digital) conversion. That is, the F/E-IC 102 performs a predetermined processing to image signals, converts analog image signals to digital image signals and outputs digital signals to the CCD1 signal processing block 1041 of the processor 104.

This signal control processing is performed based on drive timing signals generated by a TG 1024 (timing generator). The TG 1024 generates drive timing signals based on vertical synchronization signals VD and horizontal synchronization signals HD outputted from the CCD1 signal processing block 1041 of the processor 104.

The CPU block 1043 of the processor 104 controls an audio recording operation implemented by an audio recording circuit 1151. The audio recording circuit 1151 records on a memory amplification signals obtained from an amplifier 1152 in correspondence to control commands from the CPU block 1043. The amplification signals of the amplifier 1152 are obtained from audio signals converted at a microphone. The CPU block 1043 also controls operations of an audio regeneration circuit 1161. The audio regeneration circuit 1161 is constituted to play audio signals stored in the memory, output to the amplifier 1162 and output audio from a speaker 1163 according to control commands from the CPU block 1043.

The CPU block 1043 further controls a strobe circuit 114 so that illumination light is emitted from the strobe light emitting part 3. In addition, the CPU block 1043 also controls the distance measuring unit 5.

The CPU block 1043 is connected to a sub CPU 109. The sub CPU 109 performs display control by the sub LCD 1 via an LCD driver 111. The sub CPU 109 is further connected to an LED 8 for AF, an LED 9 for strobe, a light receiving part 6 for remote control, manipulation key units constituted from manipulation switches SW1 through SW14 and a buzzer 113.

The USB interface block 1045 is connected to a USB connector 122. The serial interface block 1046 is connected to a connector 1232 via a RS-232C serial driver circuit 1231. The TV signal display block 1049 is connected to the LCD monitor 10 via an LCD driver 117 and also connected to a video jack 119 (a jack for connecting the camera with external display devices of TV or the like) via a video amplifier 118 (an amplifier for converting the impedance of output values of the TV signal display block 1049 to an impedance of 75Ω). The memory controller block 10410 is connected to a terminal of a memory card slot 121.

The LCD driver 117 drives the LCD monitor 10 and fulfills a role of converting video signals outputted from the TV signal display block 1049 to display signals synchronized with the LCD monitor 10. The LCD monitor 10 is used to monitor a photogenic subject before photographing, confirm a photographing image and display image data recorded in the memory card or the built-in memory 120.

A fixed cylinder that constitutes a portion of the lens barrel unit 7 is disposed in the digital camera main body. The fixed cylinder is disposed so that a CCD stage 1251 is movable in the X-Y direction. The CCD stage 1251 constitutes a portion of the blurring compensation mechanism. The CCD 101 is fixed on the CCD stage 1251.

The CCD stage 1251 is driven by an actuator 1255. The actuator 1255 is driven and controlled by a drive circuit 1254. The drive circuit 1254 is constituted from a coil drive MD1 and a coil drive MD2. The drive circuit 1254 is connected to a D/A converter IC1. The D/A converter IC1 is connected to the CPU block 1043. Control data from the CPU block 1043 is inputted to the D/A converter IC1.

A central position maintaining mechanism 1263 is disposed in the fixed cylinder. The central position maintaining mechanism maintains the CCD stage 1251 to a central position when the blurring compensation switch SW 14 is off and the power source switch SW 13 is off. The central position maintaining mechanism 1263 is controlled by a stepping motor STM1. The stepping motor STM1 serves as an actuator and is driven by a driver 1261. Control data from the ROM 108 is inputted to the driver 1261.

A position detection device 1252 (Hall clement) is fitted on the CCD stage 1251. Detected outputs of the position detection device 1252 (displacement detection device) are inputted to an amplifier 1253 and inputted to the A/D converter 10411 after amplification. A blurring detection device, for example, an angular velocity sensor, that is, a gyro sensor 1240 that can detect rotations of the pitching direction and the yawing direction is disposed in the camera main body. Detected outputs of the gyro sensor 1240 pass through a high-pass filter and are inputted to the A/D converter 10411 via an amplifier 1242 thereafter. The amplifier 1242 also serves as a low-pass filter.

Next, a brief overview of the general operations of the camera according to the present invention is described.

When the mode dial SW2 is set to a photographing mode and the power source switch SW13 is pushed, the camera is activated at the photographing mode. In addition, when the mode dial SW2 is set to a play mode and the power source switch SW13 is pushed, the camera is activated at the play mode. The processor 104 determines whether the switched state of the mode dial SW2 is the photographing mode or the play mode (step 1 of FIG. 5).

In addition, the processor 104 controls the motor driver 75 to move the lens barrel of the lens barrel unit 7 to a photographable position. Furthermore, the processor 104 powers on each circuit of the CCD 101, the F/E-IC102 and the LCD monitor 10 or the like so that these circuits begin operations. When each circuit is powered on, operations in a finder mode are started.

In the finder mode, light entering the image pickup device (CCD 101) through each lens system is subjected to photoelectric conversion and sent to the CDS circuit 1021 and the A/D converter 1023 as analog signals of R, G and B. The A/D converter 1023 converts the analog signals to digital signals. The digital signals are converted into YUV image data at a YUV conversion part within a digital signal processing IC and written onto a frame memory by the memory controller (abbreviated for illustration).

The YUV image data is read out by the memory controller and sent to a TV (abbreviated for illustration) or the LCD monitor 10 via the TV signal display block 1049 so that a photographing image can be displayed. This processing is performed at an interval of 1/30 second so that the photographing image is displayed in the finder mode and updated every 1/30 second. That is, a monitoring processing is implemented (step 2 of FIG. 5). Next, whether the mode dial SW2 performs change of settings or not is determined (step 3 of FIG. 5). In the case the setting of the mode dial SW2 remains unchanged, a photographing processing is implemented by manipulating the release SW1 (step 4 of FIG. 5).

Figure 5:
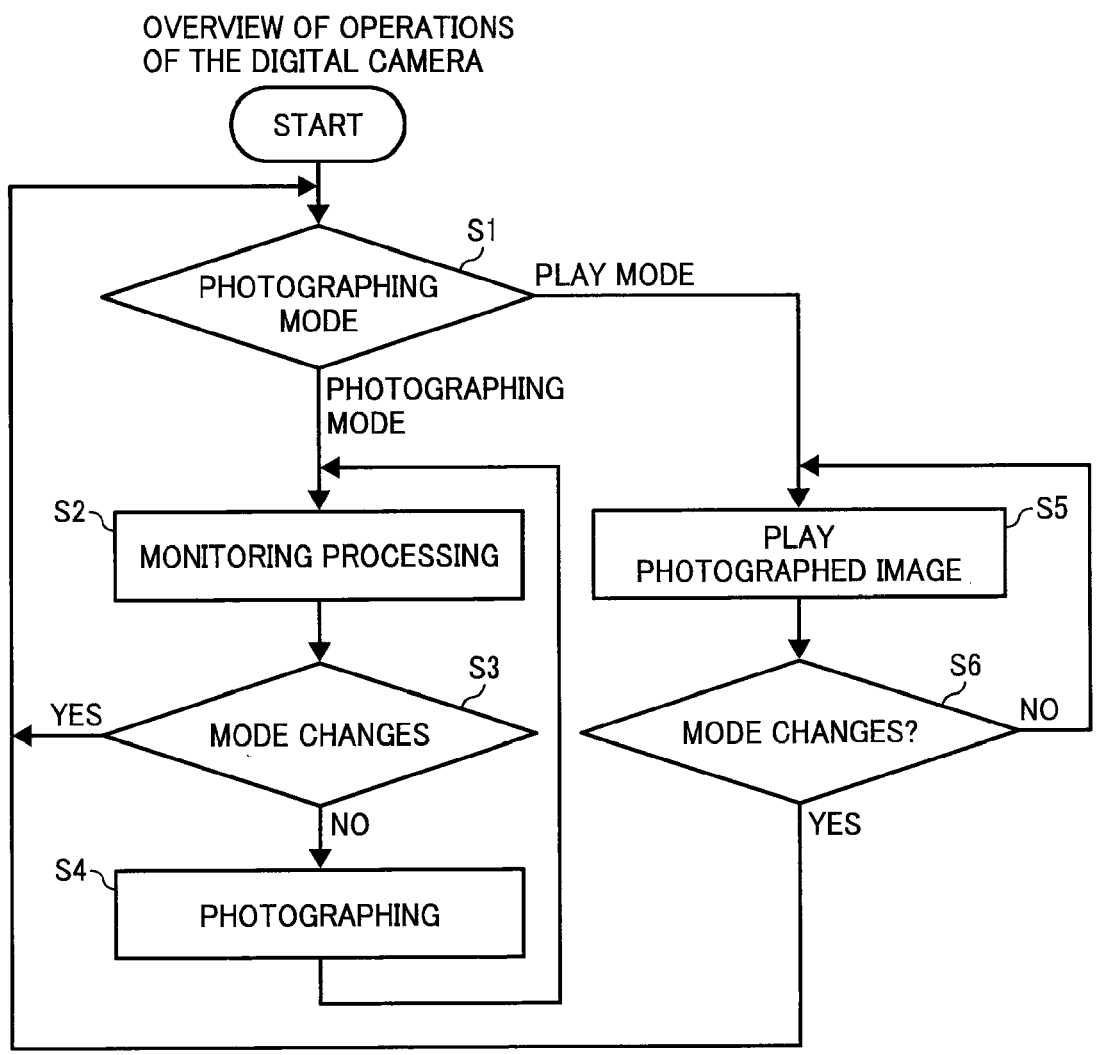
FIG. 5 is a flow chart that illustrates a brief overview of general operations of the digital camera according to the present invention.

In the play mode, the processor 104 displays the photographed images on the LCD monitor 10 (step 5 of FIG. 5). Next, the processor 104 determines whether the mode dial SW2 performs change of settings or not (step 6 of FIG. 5). In the case the setting of the mode dial SW2 is changed, the processor 104 proceeds to step 1. In the case the setting of the mode dial SW2 remains unchanged, the processor 104 repeats step 5.

(Principles of Blurring Compensation)

Figure 6A:
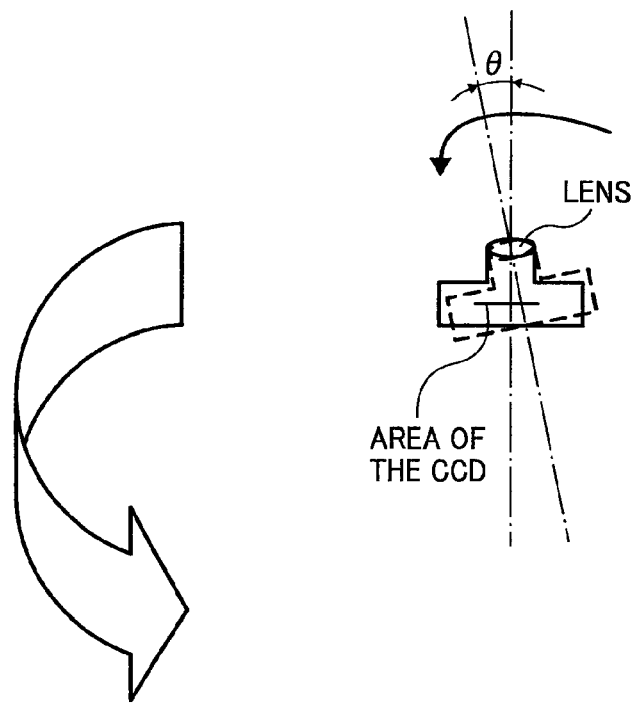
FIG. 6A is a diagram that illustrates the principles of blurring compensation of the digital camera according to the present invention and in particular, tilts of the digital camera.
Figure 6B:
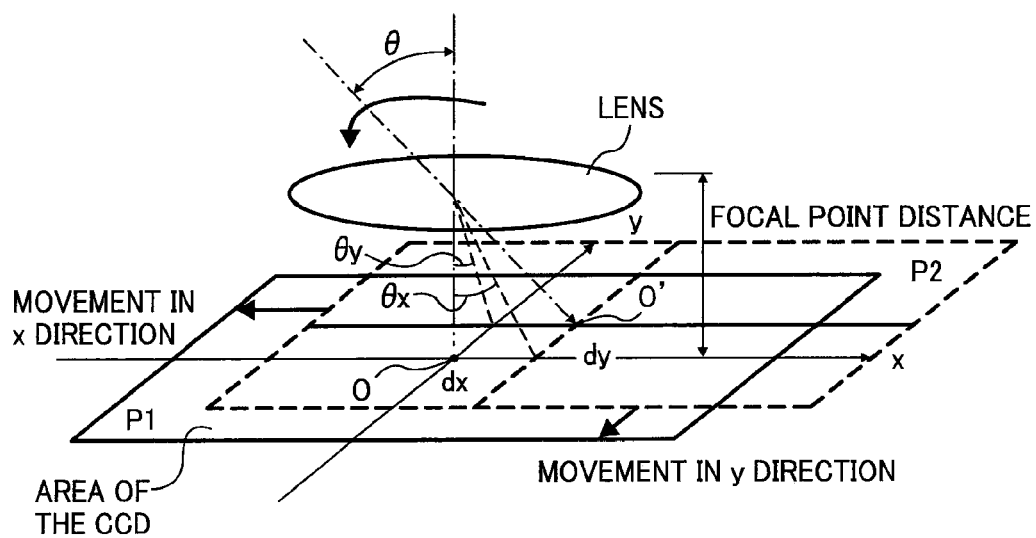
FIG. 6B is a partially enlarged diagram that illustrates the principles of blurring compensation of the digital camera according to the present invention and in particular, a relationship between a photographing lens of the digital camera and an imaging area of a CCD.

FIG. 6 is a schematic diagram for describing the principles of blurring compensation. FIG. 6A illustrates a case in which the digital camera is shifted from a state with no shakes (illustrated by a solid line) to a tilted state with shakes (illustrated by a broken line). FIG. 6B is a partially enlarged diagram illustrating a relationship between a photographing lens of the camera main body and an imaging area of the CCD 101.

When movement of the camera due to shakes is not generated, the imaging area of the CCD 101 is situated at a position P1, that is, a central position. A photogenic subject image is projected on a standard position (the position of the original point O) within the position P1 of the imaging area illustrated by solid lines in FIG. 6B. Now suppose the camera becomes tilted in a θ direction (θx, θy) due to shakes. Then the imaging area becomes shifted to a position P2 illustrated by broken lines in FIG. 6B so that the photogenic subject image shifts to O'. In order to return the photogenic subject image to the original standard position (the position of the original point O), the image area needs to be moved in parallel for dx in the X direction and for dy in the Y direction so that the position P2 of the imaging area illustrated by the broken lines crosses over the position P1 of the imaging area illustrated by the solid lines. Hereby shakes generated due to movements of the camera are referred to as camera shake which is separate from blurring appearing on an image.

(Mechanical Constitutions of the Blurring Compensation Mechanism)

Figure 7:
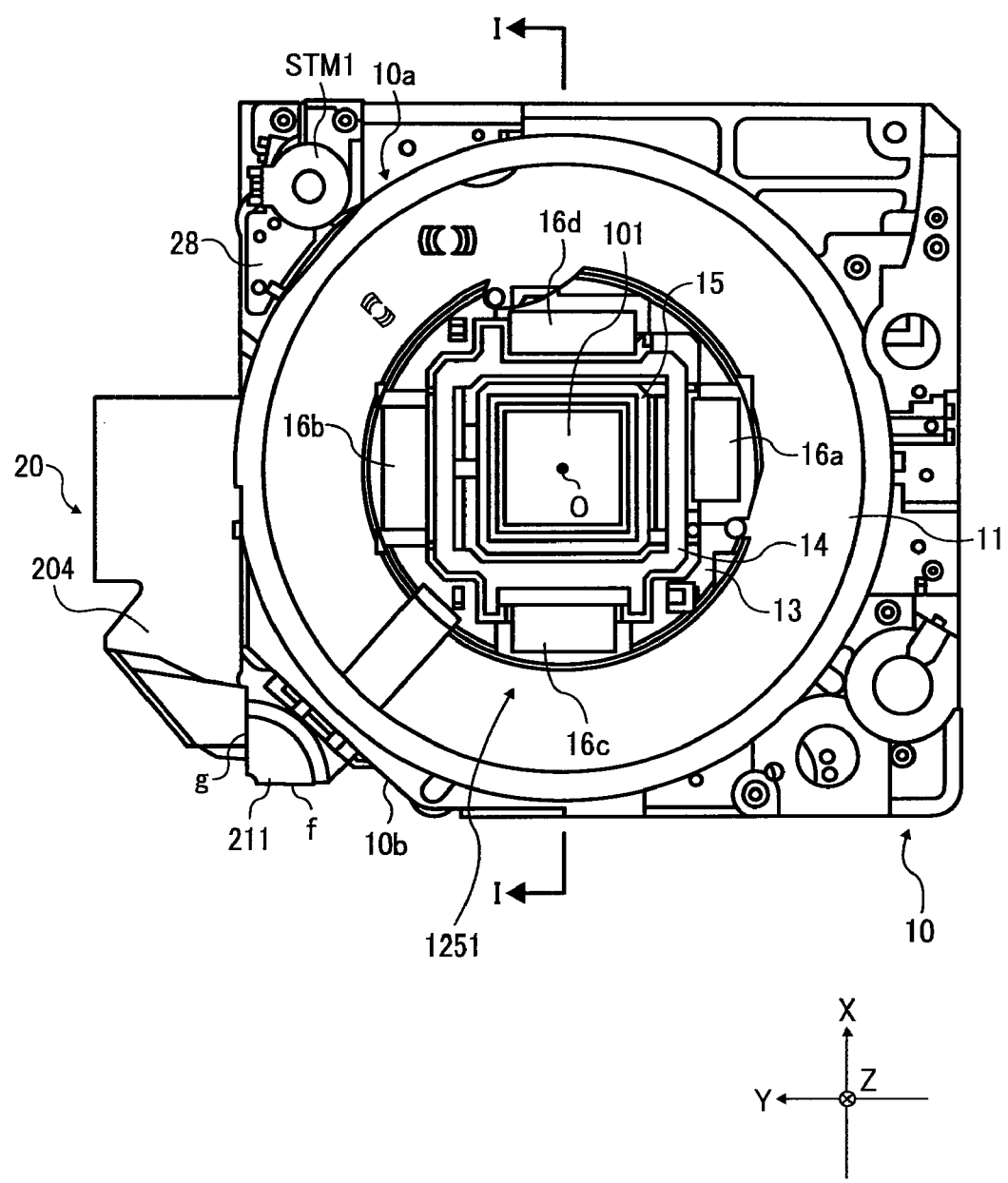
FIG. 7 is a front view that illustrates a fixed cylinder of a lens barrel of the digital camera according to the present invention.
Figure 8:
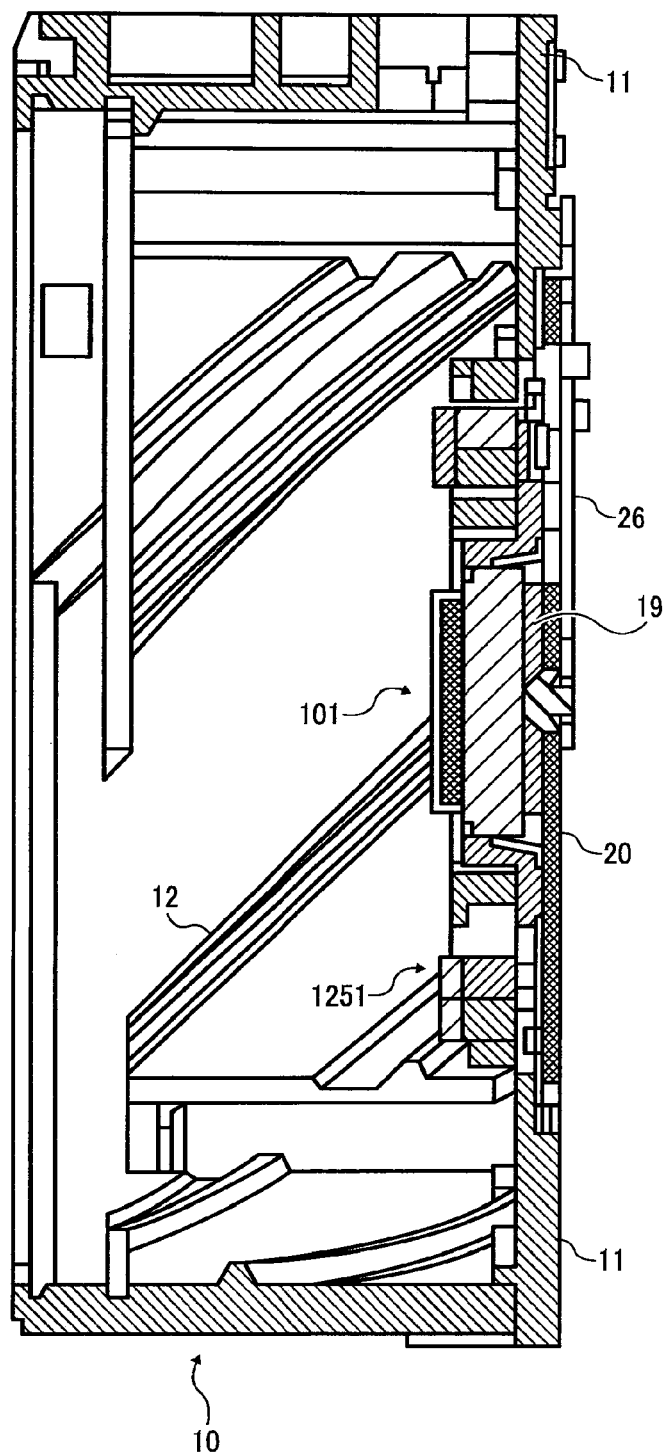
FIG. 8 is a longitudinal cross-sectional diagram of the fixed cylinder illustrated in FIG. 7.
Figure 9A:
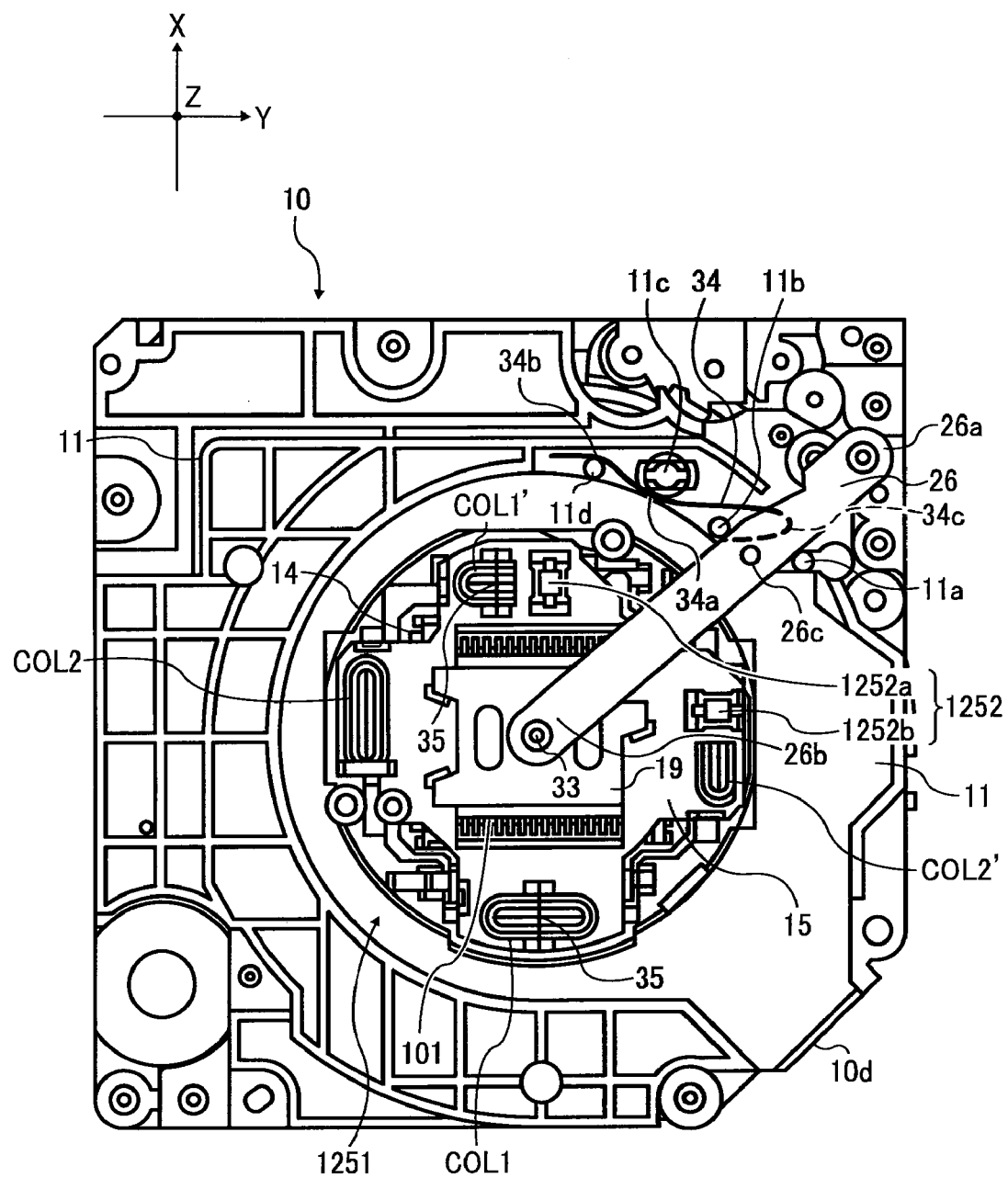
Figure 9B:
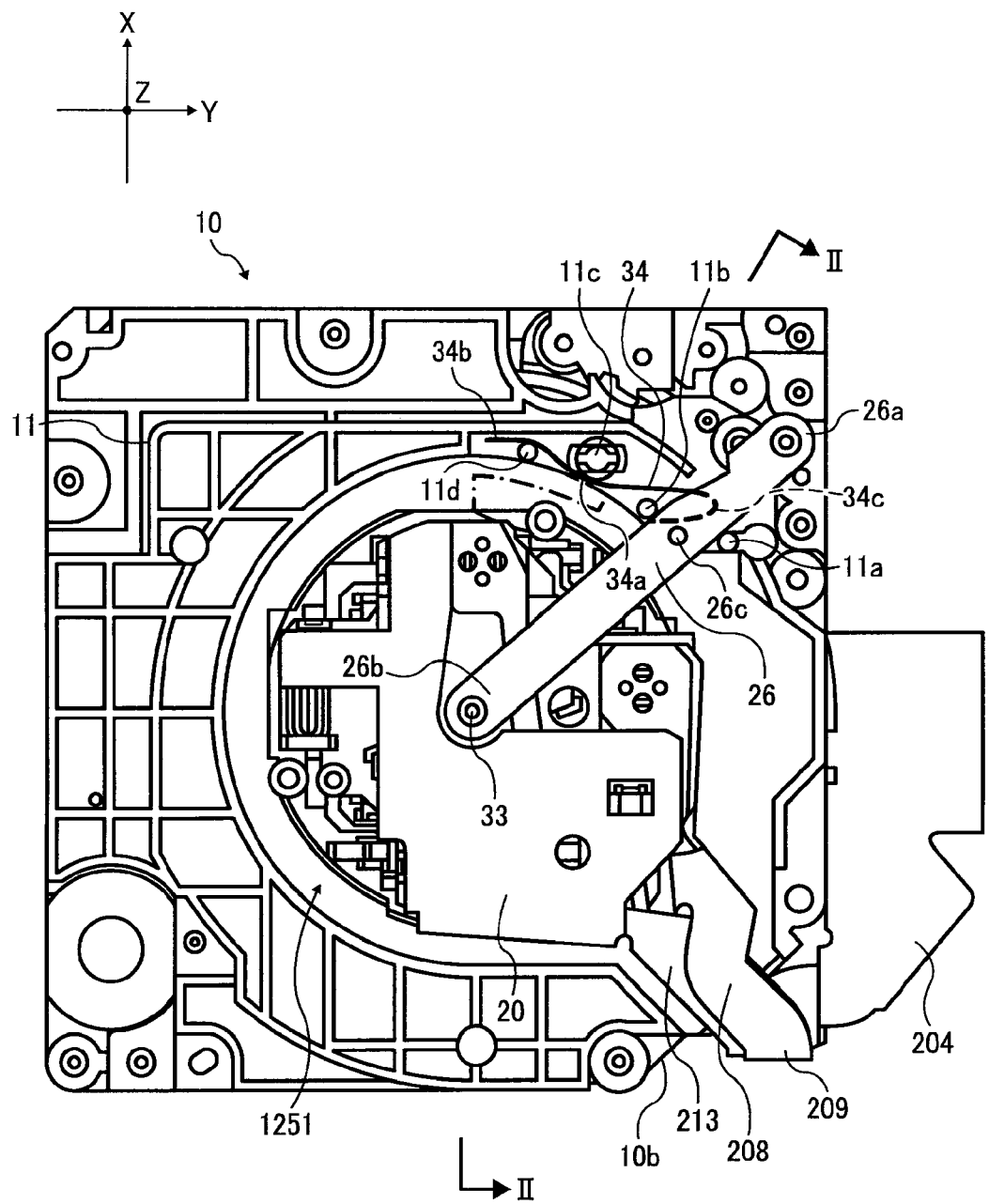

FIG. 7 is a front view of the fixed cylinder. FIG. 8 is a longitudinal cross sectional diagram of the fixed cylinder. FIG. 9 is a back view of the fixed cylinder. In FIG. 7 through FIG. 9, the numeral 10 is the fixed cylinder. The fixed cylinder 10 is box shaped. The interior of the fixed cylinder 10 is a storage space for accepting the lens barrel. A plate shaped base member 11 is fitted on a back surface of the fixed cylinder 10. The base member 11 is approximately rectangular shaped in its entirety. A helicoid 12 for rolling outward and inward the lens barrel is formed in an inner circumference wall of the fixed cylinder. At least two angular parts of the fixed cylinder 10 are notched. The later-described stepping motor STM is fitted on one angular part 10a. A later-described flexible print substrate 20 is bent at another angular part 10b.

Figure 10:
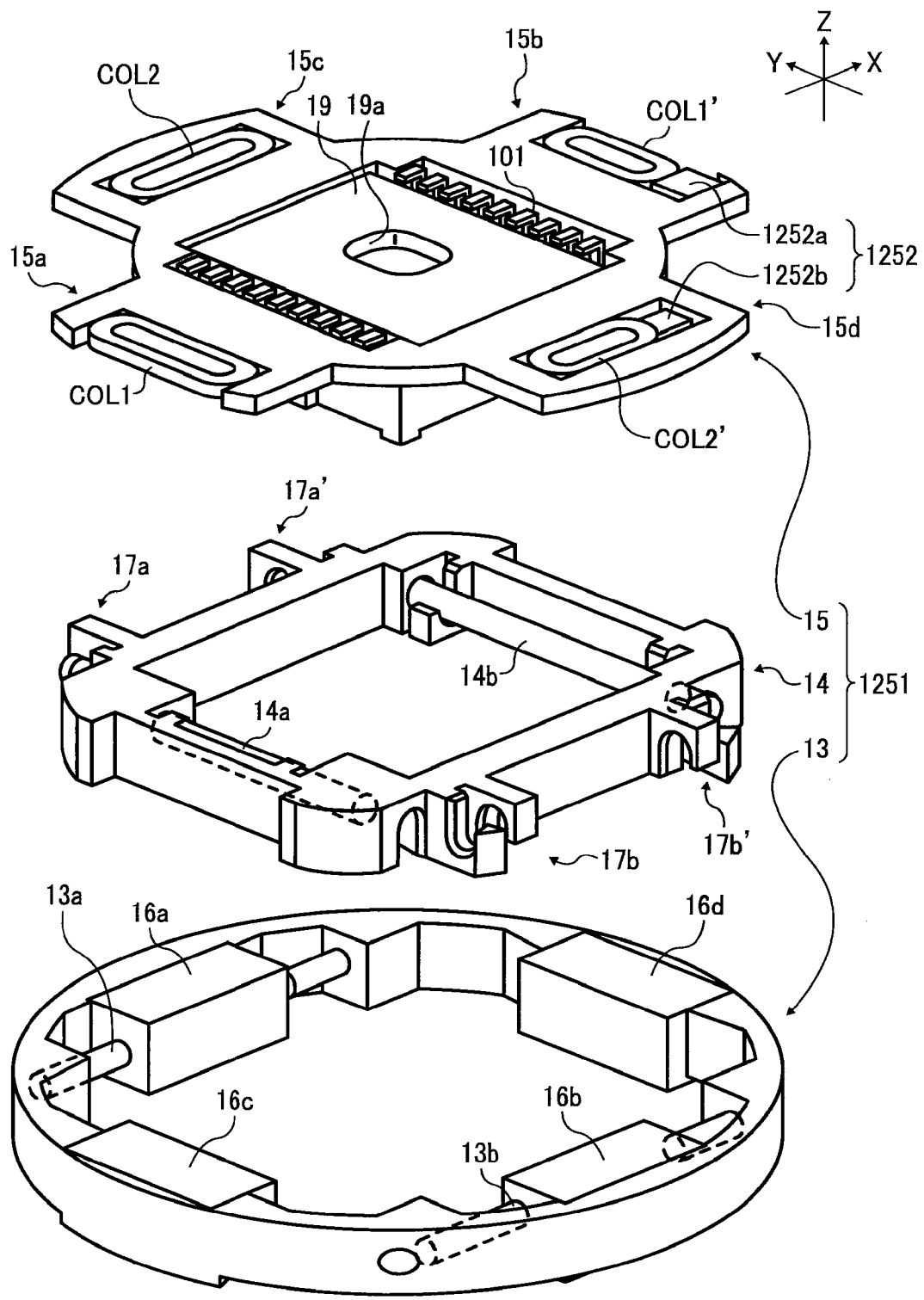
FIG. 10 is a disassembled perspective view of a CCD stage according to the present invention.

The CCD stage 1251 is disposed on the base member 11. As illustrated in FIG. 10 by a disassembled diagram, the CCD stage 1251 approximately includes an X direction stage 13 of a circular frame shape, a Y direction stage 14 of a rectangular shape and a mounting stage 15.

The X direction stage 13 is fixed on the base member 11. In the X direction stage 13, a pair of guide shafts 13a and 13b extending in the X direction is disposed leaving a mutual interval in the Y direction. In the X direction stage 13, four rectangular solid shaped permanent magnets 16a through 16d are disposed. The four permanent magnets 16a through 16d are classified into two pairs. One pair of the permanent magnets 16a and 16b is disposed in parallel within the X-Y plane leaving a mutual interval in the Y direction. In this embodiment, the pair of guide shafts 13a and 13b is constituted to pass through the pair of permanent magnets 16a and 16b but it is not limited to such and the pair of permanent magnets 16a and 16b and the pair of guide shafts 13a and 13b can be disposed in combination but with no mutual pass through.

The another pair of the permanent magnets 16c and 16d is disposed within the X-Y plane leaving a mutual interval in the X direction.

In the Y direction stage 14, a pair of guide shafts 14a and 14b extending in the Y direction is disposed leaving a mutual interval in the X direction. In the Y direction stage 14, a pair of mutually facing supported parts 17a and 17a' is formed leaving a mutual interval in the X direction. Another pair of mutually facing supported parts 17b and 17b' is formed leaving a mutual interval in the X direction. The pair of supported parts 17a and 17a' and the another pair of supported parts 17b and 17b' are formed leaving a mutual interval in the Y direction. Each of the pair of supported parts 17a and 17a' and the another pair of supported parts 17b and 17b' is movably supported respectively by the pair of guide shafts 13a and 13b of the X direction stage 13 so that the Y direction stage 14 becomes movable in the X direction.

The CCD 101 is fixed on the mounting stage 15. The mounting stage 15 includes a pair of plate parts 15a and 15b thrown out in the X direction for fitting on coils and another pair of plate parts 15c and 15d thrown out in the Y direction for fitting on coils. The CCD 101 is fixed on the approximate center of the mounting stage 15. In the mounting stage 15, a pair of mutually facing supported parts (designating numerals are abbreviated) is formed leaving a mutual interval in the Y direction. Another pair of mutually facing supported parts (designating numerals are abbreviated) is formed leaving a mutual interval in the Y direction. The pair of supported parts and the another pair of supported parts are formed on the same side of the imaging area of the CCD 101 leaving a mutual interval in the X direction. Each of the pair of supported parts and the another pair of supported parts is movably supported respectively by the pair of guide shafts 14a and 14b of the Y direction stage 14 so that the mounting stage 15 becomes movable in the X-Y direction in its entirety.

A protection plate 19 is attached onto a surface of the CCD 101 of a reverse side to the imaging area. A taper shaped concave spot 19a is formed at the center of the protective plate 19.

Spiral coil bodies COL1 and COL1' are attached respectively to the pair of plate parts 15a and 15b for fitting on coils. The coil bodies COL1 and COL1' are connected in line. Spiral coil bodies COL2 and COL2' are attached respectively to the pair of plate parts 15c and 15d for fitting on coils. The coil bodies COL2 and COL2' are also connected in line in the same manner.

Each coil body COL1, COL1' respectively confronts each permanent magnet 16c and 16d. Each coil body COL2 and COL2' respectively confronts each permanent magnet 16a and 16b. The pair of coil bodies COL1 and COL1' is used to make the CCD 101 movable in an X direction (for example, the pitching direction) orthogonal to the photographing optical axis. The pair of coil bodies COL2 and COL2' is used to make the CCD 101 movable in a Y direction (for example, the yawing direction) orthogonal to both the X direction and the photographing optical axis.

As illustrated in FIG. 9, in the coil bodies COL1 and COL1', an adsorption stick 35 constituted from magnetic materials is disposed in a direction to transverse each coil body COL1 and COL1' in the X direction.

Hereby a Hall element is used for the position detection device 1252. Within the pair of plate parts 15a and 15b for fitting on coils, the position detection device 1252, that is, the Hall element 1252a is disposed in the plate part 15b for fitting on coils. Within the pair of plate parts 15c and 15d for fitting on coils, the position detection device 1252, that is, the Hall element 1252*b* is disposed in the plate part 15*d* for fitting on coils.

The CCD 101 is electrically connected to the F/E-IC102 via the flexible printed substrate 20. The Hall elements 1252*a* and 1252*b* are electrically connected to the operational amplifier 1253 via the flexible print substrate 20. Each of the coil bodies COL1, COL1', COL2 and COL2' is electrically connected to the coil drive circuit 1254.

In the image pickup apparatus (camera) according to the present invention, shakes (angular speed) of the camera is detected by the gyro sensor 1240. The X direction position and the Y direction position of the mounting stage 15 (the actual position of the CCD 101) are respectively detected by an X position sensor, that is, the Hall element 1252*a* and a Y position sensor, that is, the Hall element 1252*b*. Then a target blurring amount of the CCD 101 is calculated by the control circuit IC and a later described control circuit IC2 so that image blurring on the CCD 101 due to shakes (shakes generated by hand) can be cancelled out. Furthermore, compensation is applied to control signals so that influences of frictional forces in the blurring compensation mechanism can be adequately reduced. Finally, control signals subjected to compensation are outputted so that the CCD 101 is controlled to be moved to an appropriate position.

(Blurring Compensation Control Circuit)

Figure 11:
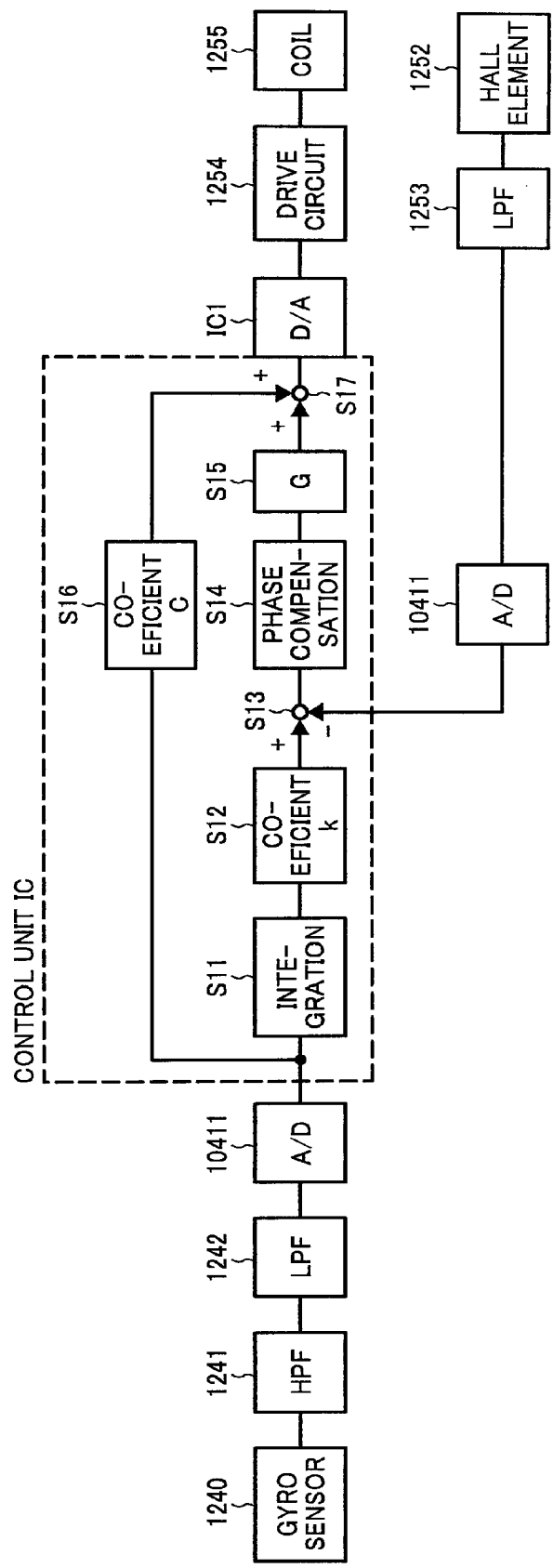
FIG. 11 is a block diagram that illustrates a constitution of a control unit related to blurring compensation in a first embodiment of an image pickup apparatus according to the present invention.

FIG. 11 is a block diagram illustrating a first embodiment of a control circuit related to blurring compensation in an image pickup apparatus (camera) according to the present invention. A control unit IC is for example, disposed internal to the CPU block 1043.

First, offsets against a standard voltage Vref are removed from an output of the gyro sensor 1240 by the high-pass filter (HPF) 1241. The outputs of the gyro sensor 1240 already removed of offsets are next removed of high frequency noise by the low-pass filter (LPF) 1242. Then the output is A/D converted by the A/D converter 12411 and loaded into the control unit IC.

Next, within the control unit IC (blurring amount calculation device), an angular velocity value indicated by the digitalized outputs of the gyro sensor 1240 is integrated to be converted into an angular value (S11) and furthermore, multiplied with a coefficient k to be converted into a blurring amount (S12). The coefficient k corresponds to focal point distances of imaging lenses 71, 72 and the sensitivity of the gyro sensor 1240. This blurring amount becomes the target blurring amount of the CCD 101 during blurring compensation.

On the other hand, the position sensor detects the positions of the CCD 101. Signals indicating an amount of displacement detected by the position sensor, that is, the Hall element 1252 are removed of high frequency noise at a low-pass filter (LPF) 1253. The signals are then A/D converted by the A/D converter 10411 and loaded into the control unit IC. This amount of displacement is an actual blurring amount of the CCD 101. The Hall element hereby is a displacement detection device.

Next, a predetermined gain (G) is multiplied by a difference between the target blurring amount and the actual blurring amount of the CCD 101 to obtain control signals (drive signal) (S15). Furthermore, the control signals are D/A converted by the D/A converter IC1. Finally, the control signals (drive signal) drive the CCD stage 1251, that is, the actuator 1255 through the drive circuit 1254 while electrical power is supplied to the coil bodies COL1, COL1', COL2 and COL2'. The control signals are hereby outputted by the control unit IC (control device). Feed-back controls are performed in such a way in which the CCD 101 follows the target blurring amount.

In addition, in the control unit IC, during the calculation of the control signals (before multiplying the predetermined gain (G) to the difference between the target blurring amount and the actual blurring amount of the CCD 101), phase lead compensation or the like is performed (S14) for stability of control. In the present invention, a feed-forward value is furthermore calculated (S16). The feed-forward value is obtained by multiplying a coefficient c to an angular velocity value. The angular velocity value is detected by the gyro sensor 1240 and already performed A/D conversion. A processing (S17) to add the feed forward value by an addition device (control unit IC) to the control signals (after multiplying the predetermined gain (G) to the difference between the target blurring amount and the actual blurring amount of the CCD 101) is performed.

Figure 12:
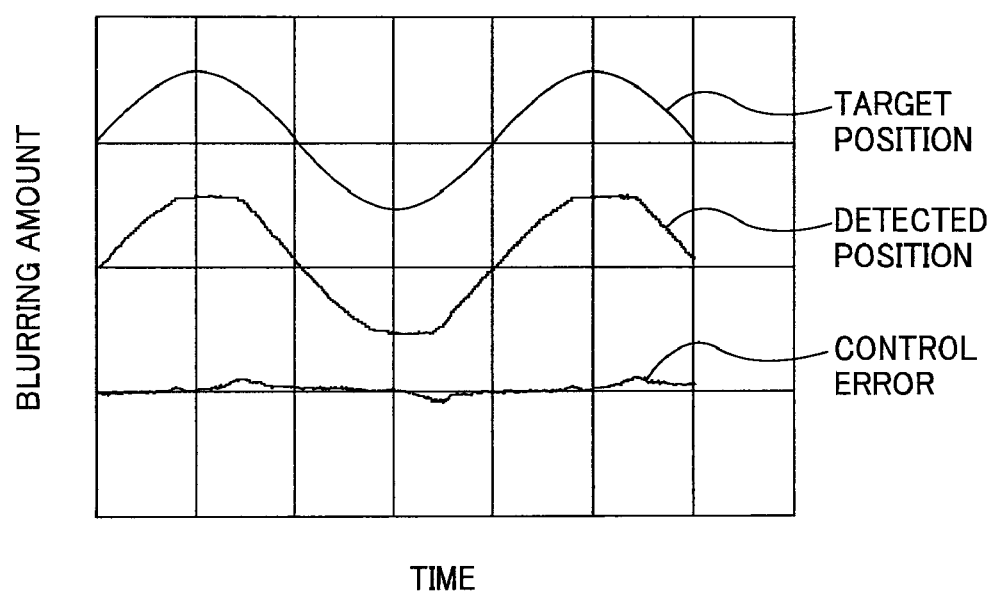
FIG. 12 is a diagram that illustrates displacements and control errors of a CCD stage when a feed forward value is not added in the control unit of FIG. 11.

This is due to the following reasons. That is, due to influences of frictional forces or the like, (for example, as illustrated in FIG. 10, the frictional force between the guide shafts 13*a*, 13*b*, 14*a*, 14*b* and the supported parts 17*a*, 17*a'*, 17*b*, 17*b'*) resistance force can be generated when the blurring compensation mechanism (blurring compensation device) is driven. At the time, if only feed back control is applied, the control signals become large not until the difference between the actual position and the target blurring amount of the CCD 101 becomes large so that errors generated due to the control increase. FIG. 12 illustrates such a state. FIG. 12 illustrates control errors of the blurring of the CCD stage 1251 when the feed forward value is not added in the control circuit of FIG. 11. In the vicinity of a hill or a valley of a displacement curve of the target blurring amount of the CCD 101 (that is, when the velocity of blurring is in the vicinity of zero), due to influences of frictions or the like related to stage driving, percentage increases of the blurring amount at a convex portion of a hill of a displacement curve of the actual position of the CCD 101 (detected position) are reduced and percentage decreases of the blurring amount at a concave portion of a valley are reduced so that control errors in these time ranges become large.

For improvement of this problem, in the present invention, signals obtained by multiplying a predetermined coefficient to a velocity are added to control signals so that a drive force that overcomes frictional force is provided preliminarily in a reverse direction to the direction of friction (a reverse direction to velocity).

A coefficient c multiplied at this moment is set to be large when a drive. velocity of the CCD) stage 1251 is small and influences of friction are large. The coefficient c multiplied at this moment is set to be small when a drive velocity of the CCD stage 1251 is large and influences of friction are small. In such a way, influences of friction can be reduced effectively when the drive velocity of the CCD stage 1251 is small and addition of an excessively large feed forward value can be prevented when the drive velocity is large.

Figure 13A:
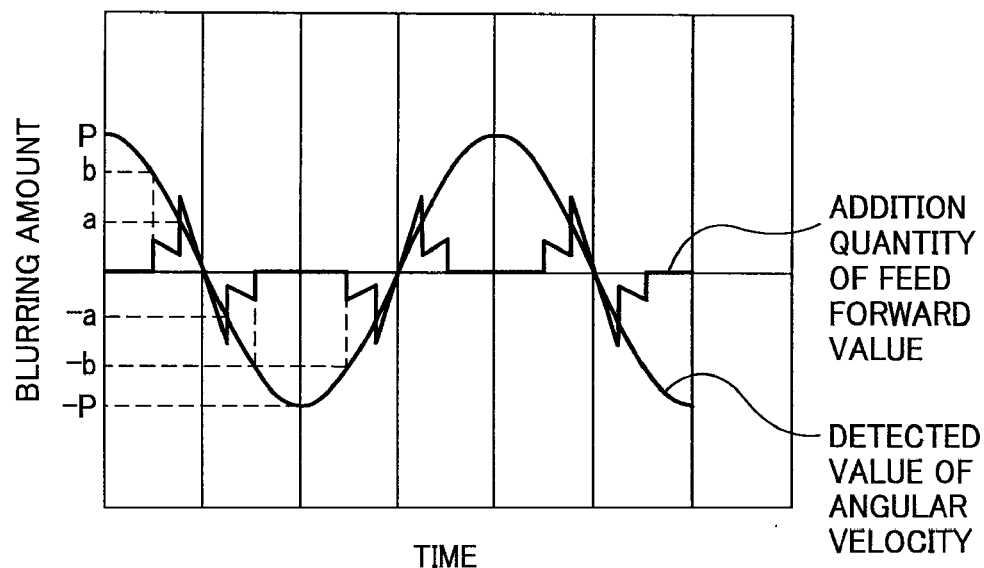
FIG. 13A is a diagram that illustrates contents of the feed forward value calculated in the control unit of FIG. 11.
Figure 13B:
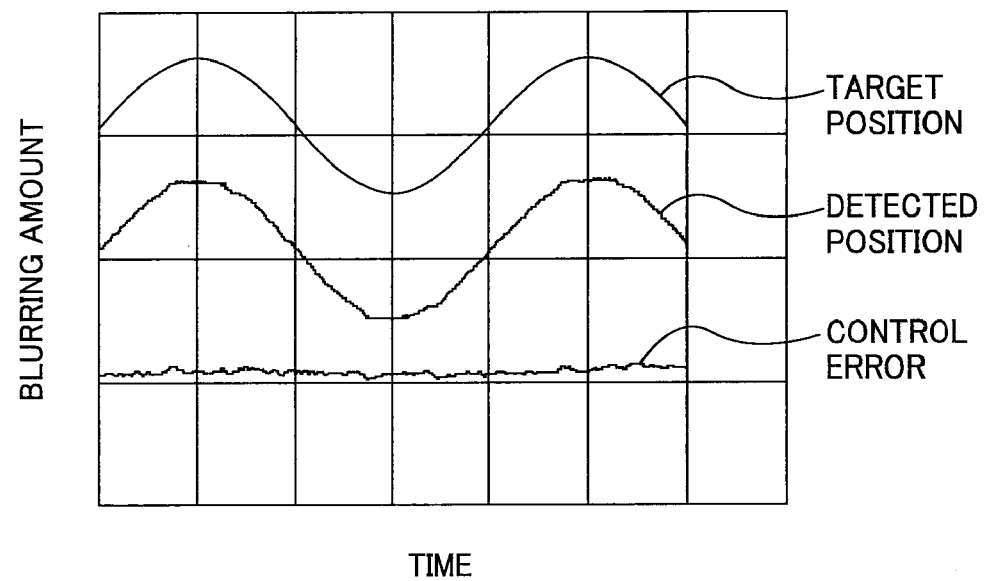
FIG. 13B is a diagram that illustrates displacements and control errors of the CCD stage based on the contents of the feed forward value calculated in FIG. 13A.

FIG. 13A illustrates calculated contents of a feed forward value in the present embodiment. FIG. 13B illustrates displacements and control errors of the CCD stage 1251 based on, the calculated contents of the feed forward value. FIG. 13A illustrates contents in which an addition quantity of a feed forward value is calculated based on an output value (angular velocity detection-value) of the gyro sensor 1240 (angular velocity sensor). Hereby, a displacement curve of the angular velocity detection value detected by the gyro sensor 1240 is illustrated as a sine wave curve and the following calculations are performed according to the size of the output values (absolute value) of the gyro sensor 1240. Firstly, when the size of the output values (absolute value) of the gyro sensor 1240 is less than a predetermined value a, a coefficient c, for example, a first coefficient c1 is multiplied to an output value of the gyro sensor 1240 and added by an addition device to an output value of the drive signal. Secondly, when the size of the output values (absolute value) of the gyro sensor 1240 is greater than or equal to the predetermined value a and less than a second predetermined value b, a second coefficient c2 smaller than the first coefficient c1 is multiplied to an output value of the gyro sensor 1240 and added by the addition device to an output value of the drive signal. Thirdly, when the size of the output values (absolute value) of the gyro sensor 1240 is greater than or equal to the second predetermined value b, an output value of the gyro sensor 1240 is not added to an output value of the drive signal.

In addition, the predetermined value a and the second predetermined value b shall be appropriately set but for example, the predetermined value a can be set to one-third of a maximum value of the angular velocity detection values by the gyro sensor 1240 and the second predetermined value b can be set to two-thirds of the maximum value. In addition, the coefficient c can be determined according to the size or the like of the frictional force of a drive mechanism in the blurring compensation mechanism.

FIG. 13B illustrates results in which blurring compensation control is performed by adding the feed forward value. In the vicinity of a hill or a valley of a displacement curve of the target blurring amount of the CCD 101 (that is, when the velocity of displacement is in the vicinity of zero), influences of frictions or the like related to stage driving to the hill portion or the valley portion of a displacement curve of the actual position of the CCD 101 (detected position) are reduced so that control errors in these time ranges become small.

Figure 14:
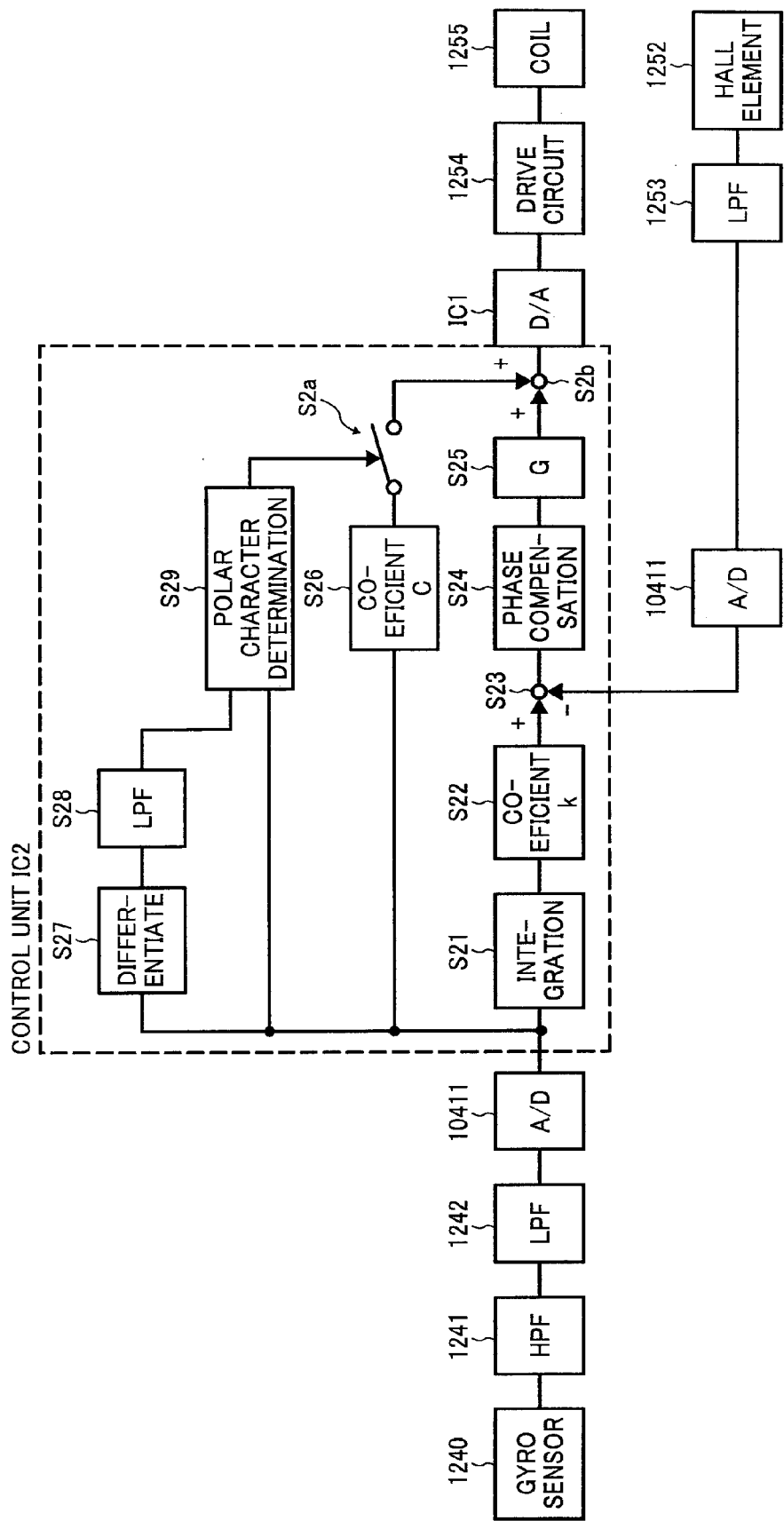
FIG. 14 is a block diagram that illustrates a constitution of a control unit related to blurring compensation in a second embodiment of the image pickup apparatus according to the present invention.

Next, a second embodiment of the control circuit related to blurring compensation in the image pickup apparatus (camera) of the present invention is described. FIG. 14 is a block diagram that illustrates the second embodiment of the control circuit related to blurring compensation in the image pickup apparatus (camera) of the present invention. In addition, a control unit IC2 is for example, also disposed internal to the CPU block 1043 of FIG. 4.

First, offsets against a standard voltage Vref are removed from an output value of the gyro sensor 1240 by the high-pass filter (HPF) 1241. The angular velocity value already removed of offsets is next removed of high frequency noise by the low-pass filter (LPF) 1242 and then AID converted by the A/D converter 12411 and loaded into the control unit IC2.

Next, within the control unit IC2 (blurring amount calculation device), a digitalized angular velocity value is integrated to be converted into an angular signal (S21) and furthermore, multiplied with a coefficient k to be converted into a positional signal (S22). The coefficient k corresponds to focal point distances of imaging lenses 71, 72 and the sensitivity of the gyro sensor 1240. This positional signal becomes the target blurring amount of the CCD 101 during blurring compensation.

On the other hand, the position sensor detects the positions of the CCD 101. Signals indicating a blurring amount detected by the position sensor, that is, the Hall element 1252 are removed of high frequency noise at a low-pass filter (LPF) 1253. The signals are then A/D converted by the A/D converter 10411 and loaded into the control unit IC. This blurring amount is an actual blurring amount of the CCD 101. The Hall element 1252 is hereby a displacement detection device.

Next, a phase lead compensation (S24) is performed to a difference (S23) between the target blurring amount and the actual blurring amount of the CCD 101 for stability of control. Then a predetermined gain (G) is multiplied to obtain control signals (S25). The control signals are hereby outputted by the control unit IC2 (control device).

Also in the present embodiment, a coefficient c is multiplied to an A/D converted angular velocity value detected by the gyro sensor 1240 to calculate a feed forward value (S26). The feed forward value is then added by an addition device (control unit IC2) to the control signals but polar character determination is performed when adding the feed forward value (S29). The feed forward value is added to the control signals (S2*b*) only when a predetermined condition is satisfied (S2*a*).

Furthermore, the control signals added with the feed forward value are D/A converted by the D/A converter IC1. Finally, the control signals (drive signal) drive the CCD stage 1251, that is, the actuator 1255 through the drive circuit 1254 while electrical power is supplied to coil bodies COL1, COL1', COL2 and COL2'.

The method of polar character determination is described in detail. First, in the control unit IC2, an output value (angular velocity value) of the gyro sensor 1240 A/D converted by the A/D converter 10411 as well as an angular acceleration signal obtained by differentiating the angular velocity value (S27) and removed of high frequency noise by the low pass filter (LPF) (S28) are both inputted to a polar character determination part (S29).

In the polar character determination part, the feed forward value is added only in the case polar character signs of the two inputted signals (angular velocity value and angular acceleration signal) are the same. In the case the polar character signs are different, determination is performed to not add the feed forward value. That is, in the case the angular velocity of blurring is plus and the angular acceleration is also plus, a state of accelerating towards the plus direction is represented. In this case, S2*a* is on and addition is performed at S2*b*. In the case the angular velocity is plus and the angular acceleration is minus, a state of decelerating but moving in the plus direction is represented. In this case, the feed forward value is not added (S2*a* is off and no addition is performed at S2*b*).

In the blurring compensation mechanism, frictional resistance functions largely during acceleration, that is, when the CCD stage 1251 starts to move from a static state. Frictional resistance is small in a moving state, for example, when velocity is large or during deceleration. During acceleration, a large frictional force functions in a direction preventing acceleration so that addition of a feed forward value that cancels out the frictional force is effective. However, during deceleration, influences of frictions are small so that if a feed forward value is added, driving force of the actuator 1255 (coil) becomes too large. In addition, in the same manner, in the case the angular velocity is minus, when angular acceleration is minus, acceleration is present in the minus direction so that a feed forward value is added. In the case the angular velocity is minus, when angular acceleration is plus, although moving in the minus direction, deceleration is present so that addition of a feed forward value is not performed.

Figure 15A:
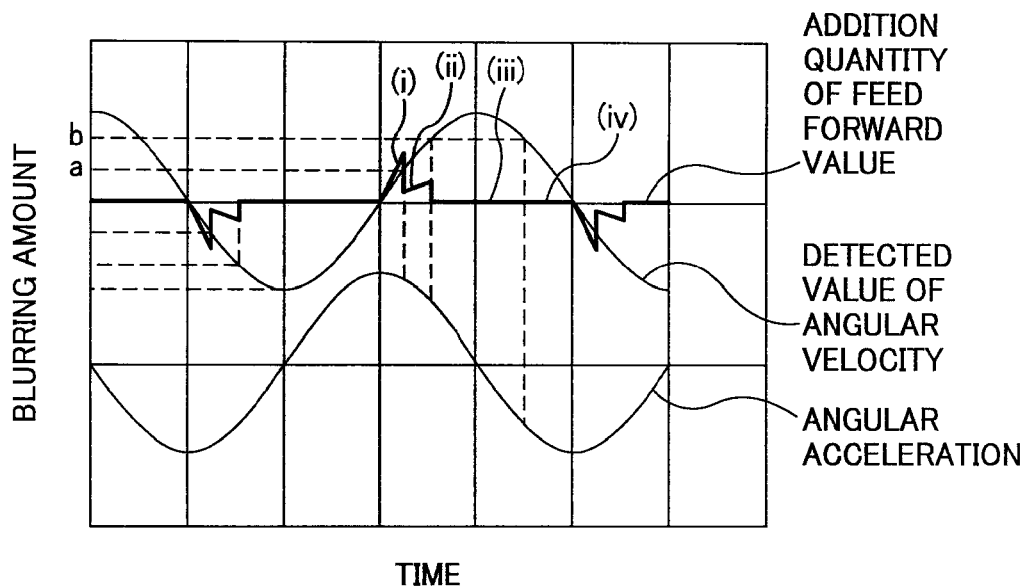
FIG. 15A is a diagram that illustrates contents of the feed forward value calculated in the control unit of FIG. 14.
Figure 15B:
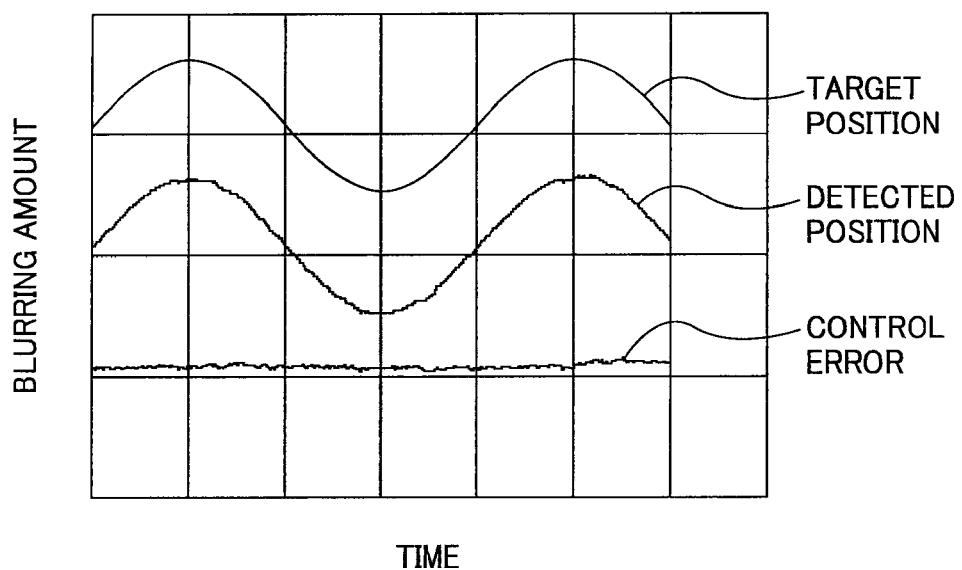
FIG. 15B is a diagram that illustrates displacements and control errors of the CCD stage based on the contents of the feed forward value calculated in FIG. 15A.

FIG. 15A illustrates calculated contents of the feed forward value in the present embodiment. FIG. 15B illustrates displacements and control errors of the CCD stage 1251 based on the calculated contents of the feed forward value. FIG. 15A illustrates contents in which an addition quantity of a feed forward value is calculated based on both an output value (angular velocity detection values) of the gyro sensor 1240 and its differential value (angular acceleration). Hereby, a displacement curve of the angular velocity detection value detected by the gyro sensor 1240 is illustrated as a sine wave curve and the following calculations are performed according to the size of the output values (absolute value) of the gyro sensor 1240, signs of the output values of the gyro sensor 1240 and signs of differential values (angular acceleration) of the output values. Firstly, when the size of an output value (absolute value) of the gyro sensor 1240 is less than a predetermined value a, in the case a sign of the output value of the gyro sensor 1240 and a sign of a differential value of the output value (angular acceleration) are the same (plus) ((i) of FIG. 15A), a coefficient c, for example, a first coefficient c1 is multiplied to the output value of the gyro sensor 1240 to obtain a feed forward value. The feed forward value is then added by an addition device (control unit IC2) to an output value of the drive signal. Secondly, when the size of an output value (absolute value) of the gyro sensor 1240 is greater than or equal to the predetermined value a and less than a second predetermined value b, in the case a sign of the output value of the gyro sensor 1240 and a sign of a differential value of the output value (angular acceleration) are the same (plus) ((ii) of FIG. 15A), a second coefficient c2 smaller than the first coefficient c1 is multiplied to the output value of the gyro sensor 1240 to obtain a feed forward value. The feed forward value is then added by the addition device to an output value of the drive signal. Thirdly, when the size of the output values (absolute value) of the gyro sensor 1240 is greater than or equal to the second predetermined value b ((iii) of FIG. 15A), an output value of the gyro sensor 1240 is not added to an output value of the drive signal. Fourthly, when the size of the output values (absolute value) of the gyro sensor 1240 is less than the second predetermined value b, in the case signs of the output values of the gyro sensor 1240 and signs of differential values of the output values (angular acceleration) are different (output values of the gyro sensor 1240 are plus, angular accelerations are minus) ((iv) of FIG. 15A), an output value of the gyro sensor 1240 is not added to an output value of the drive signal.

When FIG. 15B is compared to the graph (FIG. 13B) of the first embodiment, in the graph (FIG. 13B) of the first embodiment illustrating displacements and control errors of the CCD stage 1251, a feed forward value is also added to a portion just short of a bill or a valley of the displacement curve (during deceleration) so that detected positions of the CCD 101 exceed a target blurring amount and slight control errors are generated. In comparison, in the present embodiment (FIG. 15B), a feed forward value is not added to the portion just short of the hill or the valley of the displacement curve (during deceleration) so that no excessive driving force is generated at the actuator 1255 (drive coil), Therefore, the positions of the CCD can be precisely controlled to target blurring amount with almost no control errors.

That is to say, the image pickup apparatus according to the present invention includes, as illustrated in FIG. 11, the angular velocity sensor (the gyro sensor 1240) that detects shakes of the image pickup apparatus main body, a blurring amount calculation device (the control unit IC, specifically, step S11 and S12 in FIG. 11) that calculates a blurring amount of an image by integrating an output value of the angular velocity sensor in which the image is generated by an imaging lens and projected onto a light receiving surface of an image sensor (the image pickup device or the CCD 101), a blurring compensation device (the blurring compensation mechanism of FIG. 10) that compensates for the blurring of the image due to the imaging lens by displacing the image pickup device (CCD 101) against the imaging lens, a displacement detection device (Hall element 1252) that detects an amount of the displacement of the blurring compensation device, a control device (control unit IC) that generates an output value of a drive signal to drive the blurring compensation device based on a difference between the blurring amount calculated by the blurring amount calculation device due to blurring and the blurring amount detected by the displacement detection device. The image pickup apparatus, as illustrated in FIG. 11 and FIG. 13, also includes an addition device (control unit IC) that multiplies a first coefficient (c1) to an output value of the angular velocity sensor and adds the product to an output value of the drive signal when the output value of the angular velocity sensor is less than the first predetermined value (a of FIG. 13A) The addition device (control unit IC) multiplies a second coefficient (c2) smaller than the first coefficient to an output value of the angular velocity sensor and adds the product to an output value of the drive signal when the output value of the angular velocity sensor is greater than or equal to the first predetermined value.

The addition device (control unit IC2 in this case) of the image pickup apparatus described above, as illustrated in FIG. 14 and FIG. 15, multiplies a first coefficient (c1) to an output value of the angular velocity sensor and adds the product to an output value of the drive signal when the output value of the angular velocity sensor is less than the first predetermined value (a of FIG. 15A) and further a sign of the output value (angular velocity) of the angular velocity sensor (gyro sensor 1240) and a sign of a differential value of the output value (angular acceleration) are the same. Besides, the addition device (control unit IC2) multiplies a second coefficient c2 smaller than the first coefficient c1 to an output value of the angular velocity sensor and adds the product to an output value of the drive signal when the output value of the angular velocity sensor is greater than or equal to the predetermined value and further a sign of the output value of the angular velocity sensor and a sign of a differential value of the output value are the same.

The addition device (control Unit IC and control unit IC2 in this case) of the image pickup apparatus described above does not add the product to an output value of the drive signal when the output value of the angular velocity sensor is greater than or equal to a second predetermined value (b in FIG. 13A and FIG. 15A) which is larger than the first predetermined value.

Advantageous effects of the present invention are as follows. According to the present invention, the first coefficient is multiplied to an output value of the angular velocity sensor when the output value of the angular velocity sensor is less than the predetermined value and the product is added by the addition device to an output value of the drive signal. The second coefficient smaller than the first coefficient is multiplied to an output value of the angular velocity sensor when the output value of the angular velocity sensor is greater than or equal to the predetermined value and the product is added by the addition device to an output value of the drive signal. Therefore, influences of frictional forces can be reduced at the initial state of driving in which influences of static frictional force and kinetic frictional force are large. At a later state in which influences of frictional forces are small, generation of unnecessary driving force is avoided so that the blurring compensation mechanism (blurring compensation device) can be controlled precisely.

In addition, according to another advantageous effect of the present invention, the addition device multiplies the first coefficient to an output value of the angular velocity sensor when the output value of the angular velocity sensor is less than the predetermined value in which a sign of the output value of the angular velocity sensor is the same to a sign of a differential value of the output value and adds the product to an output value of the drive signal. Besides, the addition device multiplies the second coefficient smaller than the first coefficient to the output value of the angular velocity sensor when the output value of the angular velocity sensor is greater than or equal to the predetermined value in which a sign of the output value of the angular velocity sensor is the same to a sign of a differential value of the output value and adds the product to an output value of the drive signal. Therefore, large influences of frictional forces generated during times of small velocity or acceleration can be reduced. Unnecessary driving forces are not generated at other times so that the blurring compensation mechanism (blurring compensation device) can be controlled precisely.

In addition, according to another advantageous effect of the present invention, no addition is performed to an output value of the drive signal when an output value of the angular velocity sensor is greater than or equal to a second predetermined value larger than the predetermined value. Therefore, excessive driving forces are not generated when driving velocity of the actuator 1255 is large so that the blurring compensation mechanism (blurring compensation device) can be controlled precisely.

In addition, in the present embodiment, an example is described in which blurring compensation is performed by moving the image pickup device, for example, the CCD. But the same effects can be obtained by moving a blurring compensation lens in which the blurring compensation lens is moved so that blurring of an image of the image pickup device can be prevented. In addition, although the preferred embodiments of the present invention have been described, it should be understood that the present invention is not limited to these embodiments, and various modifications and changes can be made to the embodiments within the scope set by those skilled in the art as long as such modifications and changes can obtain the same operations and effects of the present invention.

What is claimed is:

1. An image pickup apparatus, comprising:
   an angular velocity sensor that detects a shake of the image pickup apparatus;
   a blurring amount calculation device that integrates output values of the angular velocity sensor and calculates a blurring amount of an image projected onto a light receiving surface of an image senor, the blurring caused by an imaging lens;
   a blurring compensation device that compensates for the blurring of the image due to the imaging lens, by displacement;
   a displacement detection device that detects an amount of the displacement of the blurring compensation device;
   a control device that generates a drive signal to drive the blurring compensation device based on a difference between the blurring amount calculated by the blurring amount calculation device and the blurring amount detected by the displacement detection device; and
   an addition device, wherein
   the addition device multiplies a first coefficient to the output value of the angular velocity sensor and adds the product to an output value of the drive signal, when the output value of the angular velocity sensor is less than a first predetermined value, and
   the addition device multiplies a second coefficient smaller than the first coefficient to the output value of the angular velocity sensor and adds the product to the output value of the drive signal, when the output value of the angular velocity sensor is greater than or equal to the first predetermined value.

2. The image pickup apparatus according to claim 1, wherein
   the addition device is configured to multiply the first coefficient to the output value of the angular velocity sensor and adds the product to the output value of the drive signal, when the output value of the angular velocity sensor is less than the first predetermined value and further a sign of the output value of the angular velocity sensor and a sign of a differential value of the output value are the same, and
   the addition device is configured to multiply the second coefficient smaller than the first coefficient to the output value of the angular velocity sensor and adds the product to the output value of the drive signal, when the output value of the angular velocity sensor is greater than or equal to the first predetermined value and further the sign of the output value of the angular velocity sensor and the sign of the differential value of the output value are the same.

3. The image pickup apparatus according to claim 1, wherein
   the addition device is configured not to add the product to the output value of the drive signal, when the output value of the angular velocity sensor is greater than or equal to a second predetermined value which is larger than the first predetermined value.

* * * * *